Oct. 20, 1925.  
M. MARTIN  
MOLDING APPARATUS FOR THE MANUFACTURE OF TUBULAR EARTHENWARE OR STONEWARE ARTICLES  
Filed Aug. 19, 1924  
1,558,030
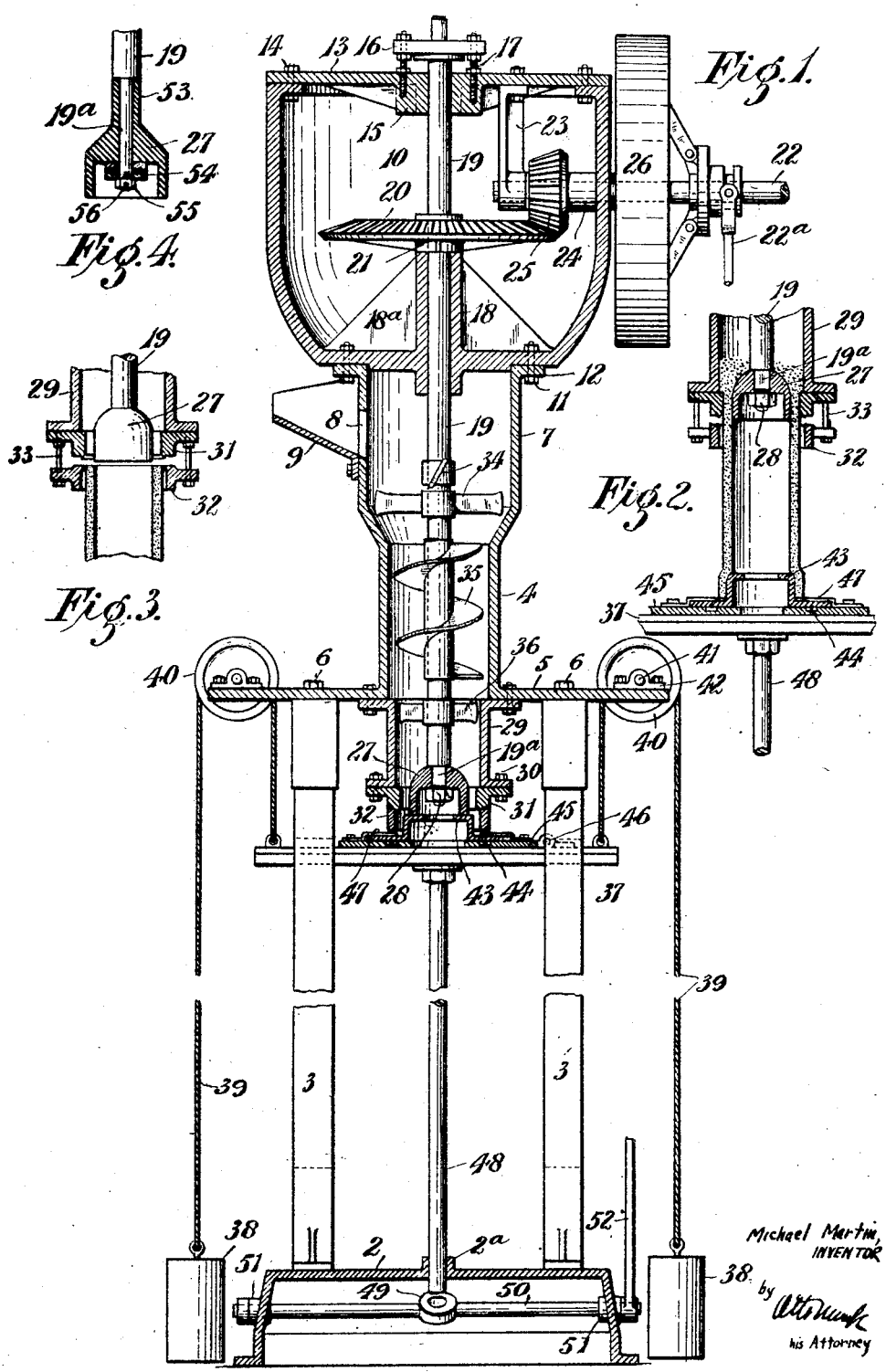

Patented Oct. 20, 1925.

1,558,030

UNITED STATES PATENT OFFICE.

MICHAEL MARTIN, OF BALLARAT, VICTORIA, AUSTRALIA.

MOLDING APPARATUS FOR THE MANUFACTURE OF TUBULAR EARTHENWARE OR STONEWARE ARTICLES.

Application filed August 19, 1924. Serial No. 732,910.

*To all whom it may concern:*

Be it known that I, MICHAEL MARTIN, a subject of the King of Great Britain, residing at Ballarat, in the State of Victoria, Commonwealth of Australia, have invented new and useful Improvements in Molding Apparatus for the Manufacture of Tubular Earthenware or Stoneware Articles, of which the following is a specification.

This invention relates to improvements in apparatus for the manufacture of earthenware or stoneware pipes or like tubular articles such as are used in the construction of drains and sewers and for analogous purposes, and it has been devised to provide a pipe-making apparatus that will be found to be very efficient in operation by ensuring more effective results in the manufacture of such articles and a better product than has hitherto been obtainable by the employment of existing types of machines.

Apparatus and machines for the manufacture of pipes formed of earthenware or stoneware have included spider-frames or bridges, that are fixedly mounted in the charging barrel to support a stationary core or "bell", and also to provide bearings for a vertical shaft that imparts motion to feed devices to force the plastic material to a die about said core. These spider-frames or bridges being disposed between said feed devices and the die result in the plastic material being divided into sections as it is progressively fed to the die, and is frequently the cause of imperfect knitting or binding of the material and consequential weaknesses in the product.

A pipe-making machine according to my invention is so constructed that it is devoid of any such obstruction as spider-frames, bridges or bearings between the feed devices and the core and die, whereby the liability of the tubular articles becoming cracked or fractured is reduced to the minimum. Moreover, the cost of manufacture is appreciably reduced, while the manufactured tubular articles possess greater strength and durability and have a superior finish both internally and externally than similar articles produced by machines previously in use and known to me.

The improved machine is further characterized by having a core mounted on and rotatable with the shaft carrying the feed-devices, and an inner mold member that is adapted to be rotated by the pressure exerted by the plastic material during the progressive manufacture of the pipe or like tubular article.

In order that the invention and its objects will be clearly understood, reference is made to the accompanying drawings, wherein:—

Figure 1 is a view in vertical section of the improved pipe-making apparatus.

Figure 2 is a detail sectional view illustrating the progressive manufacture of a pipe by apparatus according to the invention.

Figure 3 is a sectional view showing means for cutting off a manufactured pipe to a required length.

Figure 4 is a sectional view illustrating an alternative arrangement of core according to which it is capable of being rotated independently of the shaft by the force-feed of the plastic material to the die.

The improved pipe-making apparatus has a cast metal base 2, upon which are fixedly mounted the frame standards 3.

A charging barrel 4 of cast metal having a base 5 is mounted vertically on said frame standards, and it is secured rigidly in position by bolts 6. The upper portion 7 of said charging barrel is of increased diameter, and it is constructed having a feed opening 8, about which is fitted a chute 9 to facilitate the delivery into said barrel of the plastic earthenware or stoneware employed for the manufacture of the pipes or like tubular articles.

A hollow head 10 of bowl-shape and constructed of cast metal is rigidly affixed by bolts 11 to an outward flange 12 that is formed on the upper end of said charging barrel.

Said head 10 is furnished with a cover plate 13 that is detachably fastened by bolts 14. This cover plate is constructed having on its inner surface a bearing boss 15 appropriately strengthened by webs, and to which a ball-thrust bearing 16 is adjustably secured by bolts 17.

The hollow head 10 is constructed having a vertically central and long bearing 18, which is also strengthened by webs 18ª and it extends for an approved distance into the upper portion of the charging barrel.

Revolvably mounted in said long gearing 18 and the bearing boss 15 is a vertical shaft 19 having its upper end accommodated in the thrust bearing 16 surmounted on the cover plate 13 of said hollow head.

Keyed onto the vertical shaft 19 within said hollow head is a bevel crown wheel 20 having its boss 21 supported on the upper end of said long bearing.

A horizontal shaft 22 is revolvably supported in a bracket bearing 23, that is affixed to the inner surface of said cover plate, and it is also journaled in a bearing boss 24 that is constructed integrally with said hollow head. Fitted onto said horizontal shaft between the bearings 23 and 24 is a bevel pinion 25 that meshes with said bevel crown wheel 20.

A driving pulley 26 is loosely mounted on the shaft 22 to receive a power transmission belt passing about a pulley on the spindle of an electric motor or other source of power supply. This driving pulley is constructed so as to form the outer band of an expanding clutch, the expanding member of which is slidable on but rotatable with, said shaft 22 and is adapted to be actuated in approved manner by a lever 22ª to cause said driving pulley to be made fast on said shaft as and when required for operating the apparatus.

The lower end 19ª of said vertical shaft is squared and screw-threaded, and a hollow core or "bell" 27 is detachably fitted thereon and rigidly maintained in position so as to rotate with said shaft by means of a locking nut 28. Said core is dimensioned so that its outside diameter corresponds to the interior diameter of the pipes or like tubular articles to be manufactured.

Bolted to the undersurface of the base 5 of the charging barrel 4 is a tubular member 29 providing an extension to said barrel. This extension is preferably of lesser diameter than that of the charging barrel in order that the plastic material delivered thereto will be tightly compressed for satisfactory pipe manufacture.

Detachably fastened to the lower end of said tubular extension by means of bolts 30 is a die 31 of angular construction and designed to determine the outside diameter of the barrel or body portions of the pipes above their faucet ends.

A collar 32 is slidable on relatively long bolts 33 that are secured to the flange of said die, and said collar is adapted so as to determine the outside diameter of the faucet end of a pipe being manufactured.

Radial feed blades 34 are fitted to the vertical shaft 19 within the upper enlarged portion 7 of the charging barrel 4, while fastened to said shaft within the portion of the charging barrel of reduced diameter is an archimedian feed screw 35, which co-acts with said feed blades to force the plastic material, that is delivered through the opening 8, into the annular space between the core 27 and the said die and collar for the formation of the faucet end of a pipe. Additional feed blades 36 are preferably fitted to the vertical shaft within the upper end of the tubular extension 29 to assist in the forced feed of the plastic material.

A platform 37 is slidably supported between the standards 3 of the frame of the apparatus, and it is maintained in its elevated position by counter-balance weights 38 connected to said platform by ropes or chains 39. These flexible connections pass about guide sheaves 40 that are revolvable on short spindles 41 journaled in bearings 42 secured to the base of the charging barrel 4.

An inner mold member 43 constituting the inner wall of a mold for forming the faucet end of a pipe is revolvably supported by a ball-race 44 fitted in a flat plate 45. When the core 27 and the inner mold member 43 are separated after the flange of the faucet end of the pipe has been formed, the said inner mold member is free to rotate by the pressure that is exerted by the force-feed devices on the plastic material.

The plate 45 is mounted on the platform 37 and is hinged thereto at 46, whereby the plate and the inner mold member can be conveniently elevated as an unit to facilitate the removal of a pipe or like tubular article that has been manufactured by the apparatus.

It will be understood that the "spec" 43 can be made stationary by being affixed to said plate 45, which may be desired according to the characteristics of the earthenware or stoneware material that at different times or in different localities is available for the manufacture of the tubular articles.

Secured to the upper surface of the platform 37, or alternatively to the plate 45, are trimmers 47 which are adapted to cut or smooth the ends of the faucet portion of the pipe as it is being progressively formed.

Affixed centrally to the undersurface of said platform is a vertical rod 48 which extends downwardly between the standards 3 and through a guide 2ª on the cast metal base 2. The lower end of this rod, during the gradual lowering of the platform 37 in the manner hereinafter described, is adapted to pass slidably through a guide boss 49, that is formed on a horizontal bar 50 journaled in bearings 51 carried by said base 2. A hand-lever 52 is mounted on one end of the bar 50, in order that said boss can be brought into a vertical plane to provide an abutment for the lower end of said vertical rod 48, or alternatively into a horizontal plane when it functions as a guide for said rod in its downward movement with said platform.

In operation, the platform is initially brought to its elevated position and it is restrained against downward movement by the boss 49 supporting the lower end of the rod 48, thus co-acting with the counter-balance weights 38. The earthenware or stoneware in plastic condition being delivered through the feed opening 8 into the charging barrel 4, and rotary motion being imparted to the vertical shaft 19, the feed arms 34 and 36 and associated feed-screw 35 force the material downwardly through the tubular extension 29 of said charging barrel onto the inner mold member 43 and within the space between the core 27 and the die 31 and collar 32. As said core rotates in vertical plane with the vertical shaft, the plastic material, whilst under pressure, is tightly packed interiorly of said die and collar to form the faucet end of a pipe. When the faucet end of the pipe has been made, the operator turns the boss 49 into horizontal position, thereby releasing the platform 37 from that support. The pressure exerted by the rotating feed devices on the plastic material now causes said platform and supported inner mold member 43 to be gradually lowered against the action of the counter-balance weights 38, and said boss now guides said vertical rod in its downward movement.

After the faucet end of the pipe has been made, and the platform 37 is permitted to descend, the plastic material fed under pressure, is compressed between the core 27 and the die 31 in the progressive formation of the barrel or body portion of a pipe as is illustrated by Figure 2, and the collar 32 descends gravitationally on the stud bolts 33, thus permitting a wire to be drawn across the top of said collar to cut the pipe to required length, when it is conveniently removed from the platform 37 by raising the hinged plate 45.

It will be observed that the apparatus does not include any cross-pieces or bearings within the charging barrel and disposed between the uppermost feed device and the core and die, and as a consequence the texture of the plastic material is not destroyed whereby the tubular articles manufactured will withstand required pressures and otherwise will be of very durable character.

According to the modification illustrated in Figure 4, which has been devised principally for application to apparatus employed for the manufacture of large pipes, the core 27 is adapted to rotate in harmony with the descending plastic material and independently of the vertical shaft 19. For this purpose said shaft has its lower end 19a of reduced diameter and the core constructed with an elongated neck 53 is rotatable thereon. Said core is also revolvably supported upon a ball-thrust or other bearing 54 that is mounted upon the lower end of said shaft, being retained in position thereon by a nut 55 and a locking pin 56.

What I do claim is:—

1. In apparatus for the manufacture of earthen or stoneware pipes, a charging barrel, the stationary die affixed to said barrel, a rotatable shaft extending through said barrel, feed devices mounted on said shaft and rotatable therewith, a core fitted to said shaft and rotatable therewith, and an inner mold member adapted to be rotated by the force-fed material when said inner mold-member is separated from said core.

2. In apparatus for the manufacture of earthen or stoneware pipes, a charging barrel, a stationary die affixed to the lower end of said barrel, a movable collar associated with said die for the manufacture of the faucet end of a pipe, a rotatable shaft extending through said barrel, feed devices mounted on said shaft and rotatable therewith, a core fitted to said shaft and rotatable therewith, and an inner mold member adapted to be rotated by the force-fed material when said inner mold member is separated from said core.

3. In apparatus for the manufacture of earthen or stoneware pipes and like tubular articles, a charging barrel, a stationary die affixed to said barrel, a rotatable shaft extending through said barrel, feed-devices mounted on said shaft, and a core revolvably fitted to said shaft and adapted to be rotated independently of said shaft by the pressure exerted by the force-fed plastic material employed in the manufacture of the tubular articles.

4. An improved apparatus for the manufacture of earthen or stoneware pipes and like tubular articles comprising, a base, a frame on said base, a charging barrel on said frame, a tubular extension of said barrel, a die carried by the lower end of said extension, a mold collar associated with said die, a hollow head mounted on said barrel, a long bearing formed in said head, a cover plate fastened to said head, a bearing on the inner surface of said plate, a thrust bearing mounted on said plate, a shaft revolvable in said bearings, a core fitted to said shaft and rotatable therewith, force feed devices mounted on said shaft, a counter-balanced platform movable relatively to said core, an inner mold member supported by said platform, means for initially restraining said platform against downward movement whilst the faucet end of a pipe is being formed, and means for imparting rotary motion to said shaft.

5. An improved apparatus for the manufacture of earthen or stoneware pipes and like tubular articles according to claim 4, wherein the inner mold member is secured to a plate that is hingedly mounted on the movable platform.

6. An improved apparatus for the manufacture of earthen or stoneware pipes and like tubular articles according to claim 4, wherein a vertical rod depends from the platform and a guide member for said rod is rotatably mounted and is adapted as an abutment to restrain said platform against downward movement when so required.

7. An improved apparatus for the manufacture of earthen or stoneware pipes and like tubular articles according to claim 4, wherein the mold collar is slidable on stud bolts relatively to its associated die.

In testimony whereof I affix my signature.

MICHAEL MARTIN.